Nov. 27, 1951 J. R. ANDERSON 2,576,092
PURIFICATION OF COKE OVEN BENZENE
Filed June 4, 1948
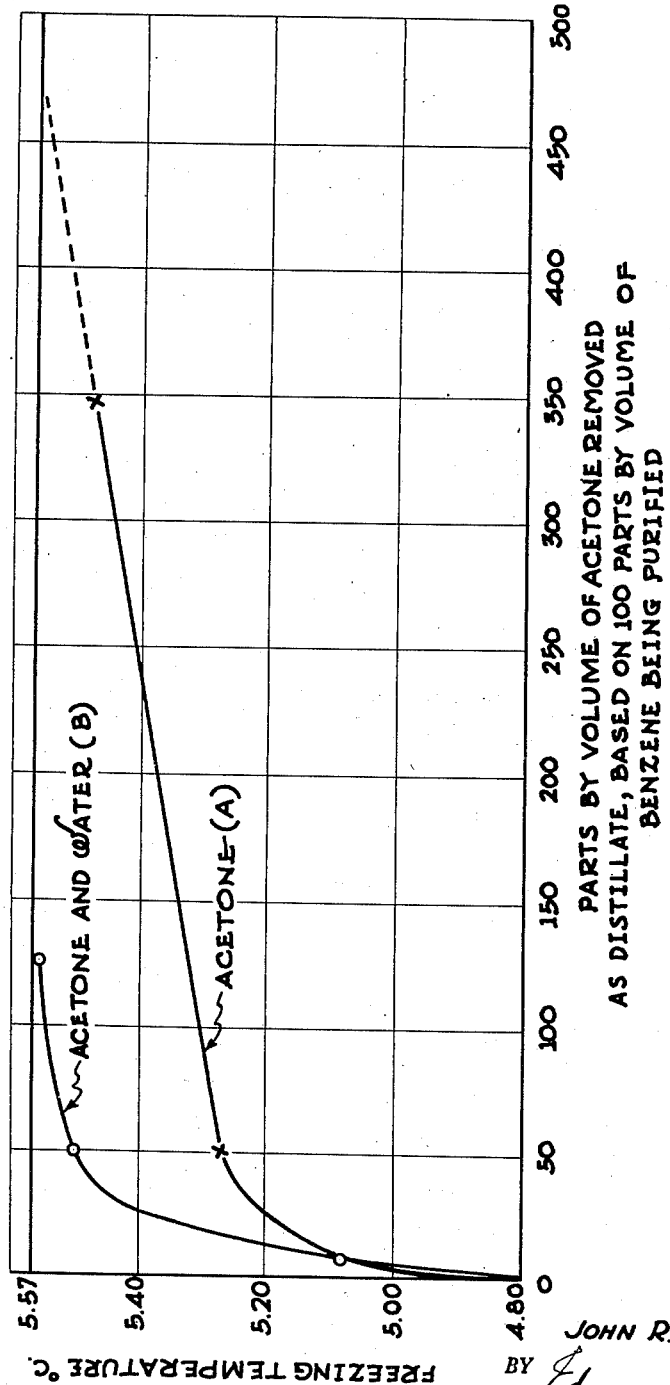
INVENTOR.
JOHN R. ANDERSON.
BY Edmund G. Gordey
his ATTORNEY.

Patented Nov. 27, 1951

2,576,092

UNITED STATES PATENT OFFICE 2,576,092

PURIFICATION OF COKE OVEN BENZENE

John R. Anderson, Pittsburgh, Pa., assignor to Koppers Company, Inc., Pittsburgh, Pa., a corporation of Delaware Application June 4, 1948, Serial No. 31,099

1 Claim. (Cl. 202—42)

This invention relates to the purification of coke oven benzene. More particularly this invention relates to the production of high purity benzene by the azeotropic distillation of coke oven benzene with acetone and water.

Pure benzene has a boiling point of 80.1° C. The impurities or contaminants in coke oven benzene which are the most troublesome so far as purification is concerned are normal heptane having a boiling point of 98.4° C., 2,2,4-trimethylpentane having a boiling point of 99.2° C., and methylcyclohexane having a boiling point of 100.9° C.

In the usual sulfuric acid washing and stripping distillation of coke oven light oil practically all of the olefins, thiophen, and paraffins and naphthenes which boil below 80° C. are separated from the best benzene especially when making nitration benzene.

The above-mentioned high boiling contaminants however are not removed by this simple process because they form nonideal solutions and in some cases azeotropes with benzene. The benzene contents of these azeotropes are very high and consequently the boiling temperatures of these azeotropic or nonideal compositions are exceedingly near the boiling point of pure benzene. Therefore small amounts of these high boiling contaminants cannot be separated from benzene by very efficient fractionation.

I have found, however, that by using an adequate amount of acetone and water as the azeotropic agents nitration benzene may be substantially purified.

Field Patent 2,212,810 describes the separation of cyclohexane from benzene by azeotropic distillation with acetone. Moreover, Field 2,302,608 describes the separation of cyclohexane from benzene by azeotropic distillation using at least 1.3 parts of acetone to one part of cylohexane and at least 0.01 part of water per part of cyclohexane.

The Field patents are adapted for the purification of cyclohexane made by the hydrogenation of benzene wherein some unconverted benzene contaminates the cyclohexane. Some petroleum distillates which contain benzene may also contain cyclohexane along with other contaminants and the process of Field may be effective in purifying such products.

I have found that coke oven benzene especially nitration benzene does not contain appreciable amounts of cyclohexane and many tests have shown that the processes, such as described in the Field patents, are not effective in removing the nonaromatic hydrocarbon impurities, such as referred to above, from coke oven benzene. My researches have also led to the discovery that even though the proportion of such contaminants in coke oven benzene is small, it takes a very large amount of acetone or of acetone plus water to remove them.

The primary object of the present invention is to provide a method of purifying coke oven benzene by a single azeotropic distillation using acetone and water as the azeotropic agents.

With this and other objects in view the invention consists in the azeotropic distillation method of purifying coke oven benzene as hereinafter described and particularly defined in the claim.

In the drawing are two curves illustrating the purification of coke oven benzene by azeotropic distillation with acetone alone and with acetone plus water as azeotropic agents. The scale of ordinates of the figures shows the freezing points of the resulting benzenes when different amounts of acetone (curve A) and different amounts of acetone plus water (curve B) are distilled from 100 parts by volume of coke oven benzene which originally had a freezing point of 4.80° C. The distillations were carried out in a column of 30 bubble plates.

It may be seen from the figure that in order to purify the original benzene to a freezing point of 5.40° C., 200 parts of acetone alone are required for 100 parts of benzene and to purify the original benzene to a freezing point of 5.50° C. when using acetone alone 350 parts of acetone are required for 100 parts of the original benzene. On the other hand, where a mixture of acetone plus water is used as the azeotropic agent, 50 parts of acetone plus water will purify the 100 parts of the original benzene to a freezing point of 5.53° C. and 180 parts of acetone+water will produce a benzene freezing at 5.55° C.

The amount of water which is required with this azeotropic distillation has been found to be effective with from 5 to 15 parts of water to 100 parts of benzene being distilled, 13.5 parts of water being used with the acetone in developing the curve illustrated in the Figure 1. However, the curve developed by the use of 10 parts of water with acetone is substantially the same as the curve illustrated in Figure 1.

It has been found that if sufficient water is present with the acetone and benzene to provide a 2-phase condition in the distilling tower, then the hydrocarbon impurities associated with the benzene are affected in such a manner that the hydrocarbon impurities are carried overhead with the acetone to effect the purification of the benzene.

An impure benzene which has a freezing point of from 4.5° C. to 5.2° C. will contain from 1.5% to 0.3% by weight of hydrocarbon impurities. It will be seen therefore that when using 125 to 150 parts of acetone per 100 parts of benzene being refined, that the amount of acetone being used is roughly 100 parts of acetone to one part of hydrocarbon impurity. Thus the process requires a very large quantity of acetone to remove a small amount of impurities. However, since the amount of impurities in coke oven benzene is small, the amount of acetone required is not prohibitive.

The impure benzene which is to be refined by the process outlined above should be treated preferably by sulfuric acid to remove sulfur compounds before it is azeotropically distilled with acetone and water.

To carry out the azeotropic distillation using acetone and water to get an ultra pure benzene, it is preferred to use an efficient fractionating tower of thirty or more bubble plates in the column and a reflux ratio of 5-20:1.

Some of the water which is added to the benzene with the acetone may remain with the distilland in the still or with the distilland removed from the base of the still. Therefore the benzene purified with the azeotropic distillation should be dehydrated to remove water to provide the pure or ultra pure benzene.

If the impure benzene has a lower freezing point so that it contains more than 1% of non-aromatic hydrocarbon impurities, then a large amount of acetone up to 150 parts of acetone to 100 parts of benzene should be used. In such a distillation, however, 5 to 15 parts of water is sufficient in order to permit high boiling hydrocarbons to be separated from the benzene.

The present process is adapted more particularly for the production of high grade pure benzene, so that if the starting material has a freezing point lower than 4.5° C. the product is purified first by ordinary distillation to bring the purity up to 4.5° to 5.0° C. freezing point material.

The preferred form of the invention having been thus described, what is claimed as new is:

An improved method for removing from distilled coke-oven benzene having a freezing point below 5.3° C. and above 4.4° C. the 0.3 to 1.5 per cent by weight of high boiling saturated hydrocarbon impurities contained therein, which comprises distilling in an efficient distillation column a mixture consisting of said benzene, from 0.5 to 1.5 parts of acetone per part of benzene by volume, and an amount of water in the range of 0.05 to .15 part per part of benzene by volume such that a two phase condition exists in said distillation column, removing water, said hydrocarbon impurities and all of said acetone as an overhead distillate, and dehydrating the residual benzene.

JOHN R. ANDERSON.

REFERENCES CITED

The following references are of record in the file of this patent:

UNITED STATES PATENTS

| Number | Name | Date |
| --- | --- | --- |
| 2,302,608 | Field | Nov. 17, 1942 |

OTHER REFERENCES

Mair et al.: "Separation of Hydrocarbons by Azeotropic Distillation," Journal of Research of the National Bureau of Standards, vol. 27, pages 39–63 (July 1941). Copy in Scientific Library.

Griswold et al.: "Purification of Commercial Benzene by Azeotropic Distillation," 38 Industrial and Engineering Chemistry, 509–512 (May 1946). Copy in Scientific Library.